(12) United States Patent
Francis et al.

(10) Patent No.: US 7,322,592 B2
(45) Date of Patent: Jan. 29, 2008

(54) AERODYNAMIC COASTING BICYCLE AND METHOD OF USE

(76) Inventors: Nalan A. Francis, P.O. Box #7894, St. Croix, VI (US) 00827; Marilyn S. Francis, P.O. Box #7894, St. Croix, VI (US) 00827

( * ) Notice: Subject to any disclaimer, the term of this patent is extended or adjusted under 35 U.S.C. 154(b) by 415 days.

(21) Appl. No.: 10/999,556

(22) Filed: Nov. 30, 2004

(65) Prior Publication Data

US 2005/0140115 A1 Jun. 30, 2005

Related U.S. Application Data

(60) Provisional application No. 60/533,681, filed on Dec. 31, 2003.

(51) Int. Cl.
*B62D 35/00* (2006.01)
(52) U.S. Cl. .............. 280/152.2; 280/288.4; 280/281.1; 296/78.1
(58) Field of Classification Search ........... 280/87.01, 280/281.1, 152.2, 288.4, 152.1; D12/181, D12/182; 296/78.1
See application file for complete search history.

(56) References Cited

U.S. PATENT DOCUMENTS

| | | | | |
|---|---|---|---|---|
| D97,461 S | * | 11/1935 | Bregman | D21/425 |
| 2,926,927 A | * | 3/1960 | Enright | 280/87.021 |
| 4,326,728 A | * | 4/1982 | Tatch | 280/288.2 |
| 4,732,428 A | * | 3/1988 | Monte | 301/64.303 |
| D299,220 S | | 1/1989 | Trusky | |
| 4,813,583 A | * | 3/1989 | Carpenter | 224/428 |
| D301,438 S | | 6/1989 | Hanamura | |
| 5,121,937 A | | 6/1992 | Lawwill | |
| 5,131,727 A | * | 7/1992 | Johnson | 301/37.41 |
| 5,275,067 A | * | 1/1994 | Lew | 74/551.1 |
| D345,725 S | * | 4/1994 | Camfield et al. | D12/182 |
| 5,324,059 A | * | 6/1994 | Bryne | 280/283 |
| 5,603,553 A | * | 2/1997 | Klieber et al. | 301/37.41 |
| D435,817 S | * | 1/2001 | Lai | D12/181 |
| 6,450,516 B1 | * | 9/2002 | Nall, III | 280/87.021 |

* cited by examiner

*Primary Examiner*—Christopher P. Ellis
*Assistant Examiner*—John D Walters
(74) *Attorney, Agent, or Firm*—Raymond M. Galasso; Galasso & Associates

(57) ABSTRACT

An aerodynamic coasting bicycle and method of use are disclosed. In one form, an aerodynamic cycling apparatus includes a main frame including a rear wheel mount and a front wheel mount. The main frame includes a light-weight material and a front wheel is coupled to the front wheel mount. A front wheel cover substantially covers an interior portion of the front wheel. A gearless rear wheel is coupled to the rear wheel mount and includes a rear wheel cover substantially covering an interior portion of the rear wheel.

15 Claims, 3 Drawing Sheets

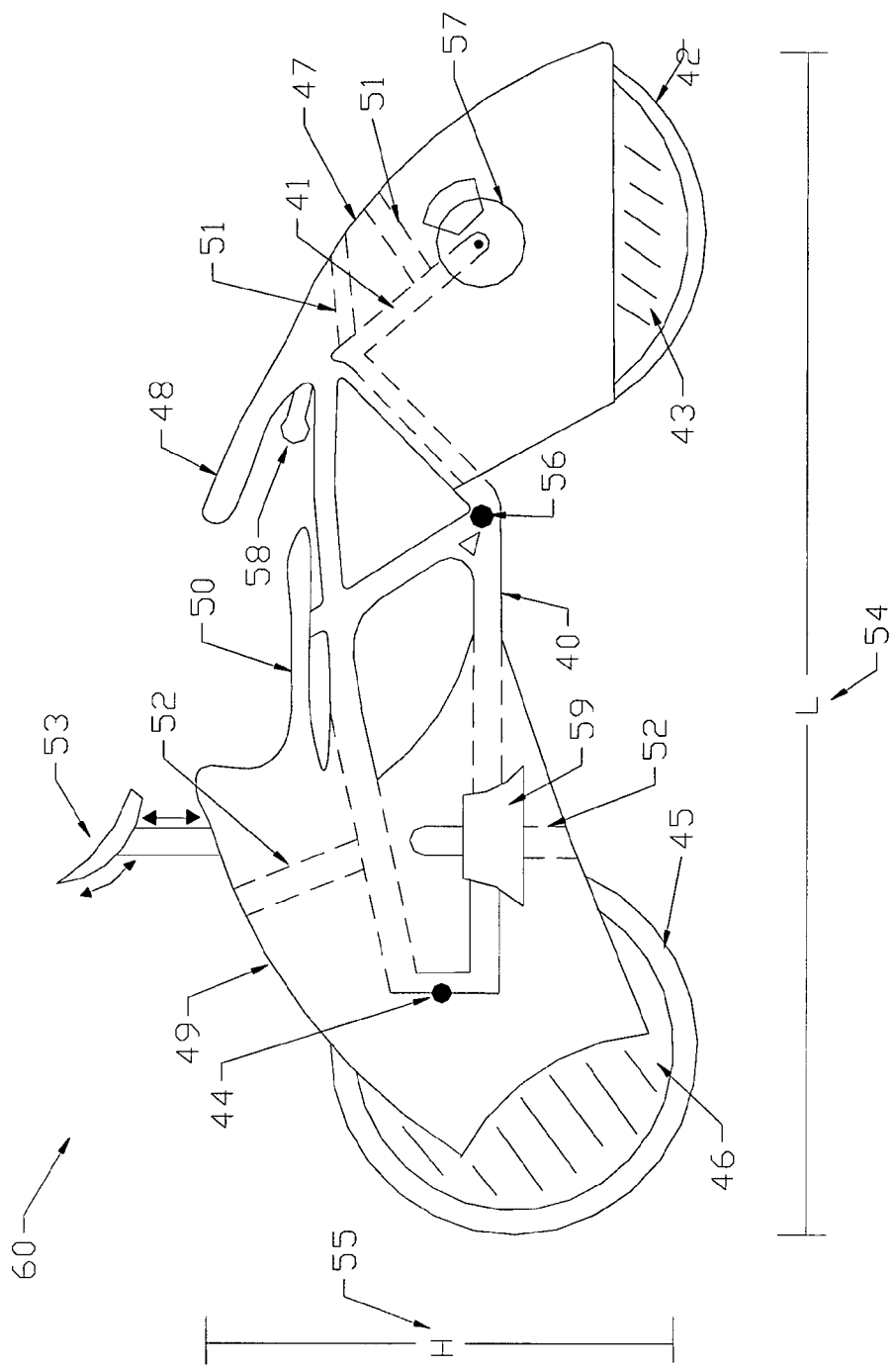

AERODYNAMIC COASTING BICYCLE AND METHOD OF USE

CROSS REFERENCE TO RELATED APPLICATIONS

This application claims priority to co-pending U.S. Provisional Patent Application having Ser. No. 60/533,681 filed Dec. 31, 2003 entitled "Coast-2-Coast", having a common applicant herewith.

FIELD OF THE DISCLOSURE

The invention relates generally to cycling, and more particularly to an aerodynamic coasting bicycle and method of use.

BACKGROUND

Road bikes today are constructed from a variety of materials, ranging from the traditional steel alloy to aluminum, titanium, magnesium and carbon fiber composites, to combinations of materials. Each of these materials has their own favorable aspect. Steel alloys are known to produce pliable frames that can be "tuned" for a particular type of riding. Aluminum frames are among the stiffer frames and are thus suitable for heavier riders or those that engage in high-energy pedaling. Titanium and carbon-fiber frames are more exotic, with better strength-to-weight ratios than steel or aluminum, but are higher in cost. The current trend among high-end frames is to use a combination of materials, such as aluminum or titanium for the main part of the frame and using carbon-fiber for the front and rear portions of the frame.

When designing race bikes, two of the most important variables are its weight and aerodynamic drag. In order to reduce wheel weight and improve aerodynamic efficiency, racing bikes have fewer spokes; a typical number is 24. In some situations, the resulting weaker wheel may not be suitable for heavier loads, landing jumps, etc., since this could cause spokes to break. To reduce both air resistance and friction on the road, tires are thin and smooth. Drop handlebars and optional handlebar extensions are combined with a raised seat post in order to put the rider in a more aerodynamic posture. However, what is lacking is reducing the drag incurred from a rider being present on the cycle.

BRIEF DESCRIPTION OF THE DRAWINGS

Other advantages, features and characteristics of the invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

FIG. 3 illustrates a side perspective view of an elongated aerodynamic coasting bicycle according to one embodiment of the invention.

DETAILED DESCRIPTION OF THE FIGURES

An aerodynamic coasting bicycle and method of use are provided. In one form, an aerodynamic cycling apparatus comprises a main frame including a rear wheel mount and a front wheel mount wherein the main frame includes light-weight materials and no mechanical drive assembly. The aerodynamic cycling apparatus further includes a front wheel coupled to the front wheel mount and a front wheel cover substantially covering an interior portion of the front wheel. A gearless rear wheel is coupled to the rear wheel mount and includes a rear wheel cover substantially covering an interior portion of the rear wheel.

In a particularized form, an aerodynamic coasting bicycle includes an elongated frame having a front aerodynamic cover substantially surrounding a front wheel of the bicycle and a front portion of the elongated frame. The front aerodynamic cover is formed to allow placement of a user's legs between the elongated frame and the front aerodynamic cover. The bicycle further includes a rear aerodynamic cover substantially covering the rear wheel and a rear portion of the elongated frame. In this manner, a reduction in drag caused by wind resistance is reduced allowing the aerodynamic coasting bicycle to accelerate at a greater rate during use.

Figure 1:
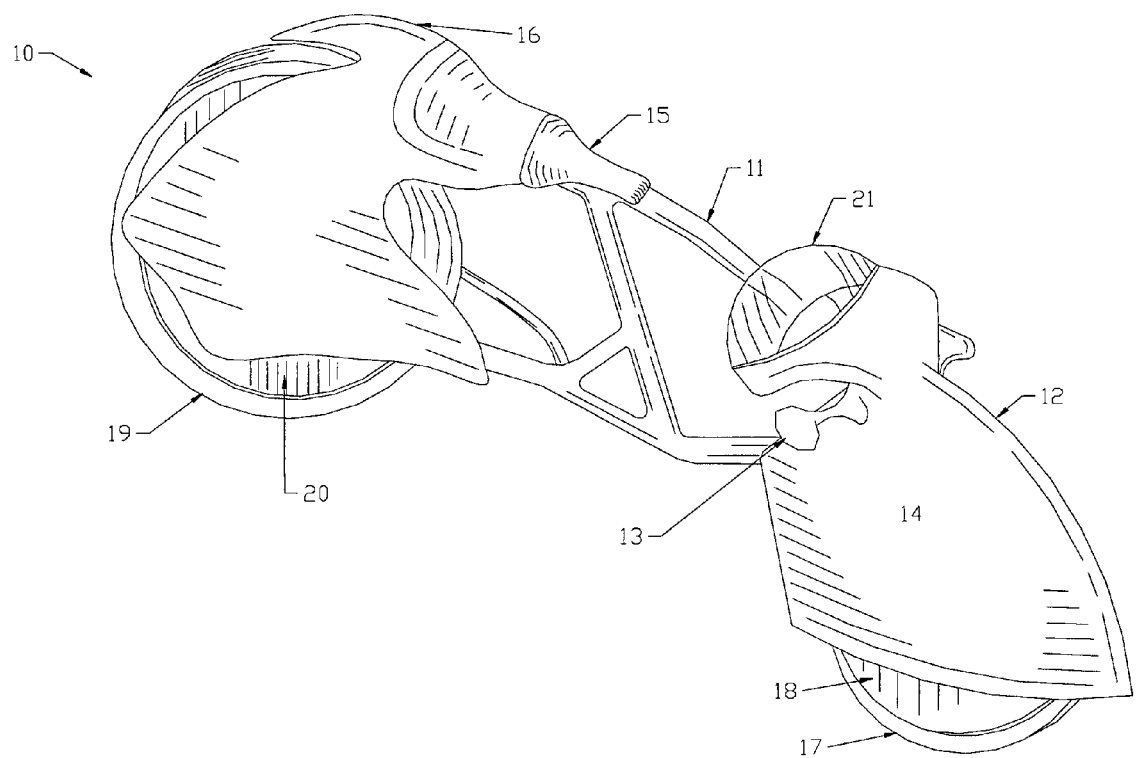
FIG. 1 illustrates a side view of an aerodynamic coasting bicycle according to one embodiment of the invention.

FIG. 1 illustrates a side view of an aerodynamic coasting bicycle according to one embodiment of the invention. Aerodynamic coasting bicycle 10 includes a main frame 11, a front wheel 17, a rear wheel 19 and a seat 15. Each wheel includes a height of approximately twenty (20) inches and a width of approximately (23) millimeters. Through providing wheel having the disclosed dimension, minimal roll resistance is realized during use thereby allowing for greater acceleration and operating speeds of bicycle 10. Bicycle 10 further includes a front aerodynamic cover 12 coupled to a front portion of main frame 11 and a rear aerodynamic cover 16 coupled to a rear portion of main frame 11. Bicycle 10 further includes a windshield 21 made of a clear plastic or plexiglass material and a rear view mirror assembly 13 coupled to and/or integrated as a part of front aerodynamic cover 12.

Main frame 11 is formed from one or more light-weight materials such as aluminum, titanium, steel alloys, carbon fiber, or other types of light-weight materials having sufficient strength and durability for providing a bicycle frame. Main frame 11 is constructed for durability and strength with each joint being welded. Front aerodynamic cover 12 is formed to provide a streamlined shroud 14 for reducing wind resistance of aerodynamic coasting bicycle 10 when used. Front aerodynamic cover 12 is sized to allow a user to place a portion of their legs between shroud 14 and main frame 11 (not expressly shown). As such, aerodynamic cover 12 is sized such that it is sized and positioned at a distance from main frame 11 to allow for a user to place a portion or all of their legs along main frame 11 and behind front aerodynamic cover 12. In one embodiment, front aerodynamic cover 12 is coupled to front fork 62 and may be varied in width from approximately five (5) to fifteen (15) degrees allowing for aerodynamic variability of front aerodynamic cover 12 and ultimately bicycle 10 during use.

Front aerodynamic cover 12 and rear aerodynamic cover 16 may be formed from one or more types of light-weight materials such as plastic, thermoplastics, fiberglass, polyethylene, polypropylene and the like such that a light-weight aerodynamic properties may be achieved. Each cover may also be finished or coated with a paint, glossy finish, wax, etc. to reduce wind resistance along each surface.

Front wheel 17 further includes a front wheel cover 18 and rear wheel 19 includes a rear wheel cover 20. Each cover substantially covers the interior portion of each wheel to further enhance aerodynamics of bicycle 10. Each cover may be coupled to a portion of one or more wheel supports such as conventional wheel spokes using coupling mechanisms such as clips, plastic tie-straps, and the like. Each cover substantially covers the interior portion of each wheel to further enhance aerodynamics of bicycle 10. Each cover may be coupled to a portion of one or more wheel supports such as conventional wheel spokes using coupling mechanisms such as clips, plastic tie-straps, and the like. Each cover may be made of light-weight materials such as plastic, thermoplastics, fiberglass, polyethylene, polypropylene and the like such that a light-weight aerodynamic properties may be achieved.

Bicycle 10 is provided as a non-mechanical bicycle that relies on gravity to provide acceleration during use. For example, a user may position bicycle 10 along a hillside or course having a downward slope to allow a user to coast downhill along a surface. As the user initiates bicycle 10 down a slope, each aerodynamic element of bicycle 10 contributes to increasing the overall acceleration or propulsion of bicycle 10 through reducing wind resistance that traditional downhill bicycles encounter. For example, wind resistance of a user typically decelerates conventional bicycles. As such, a user using bicycle 10 having front aerodynamic cover 18 allows a user to be positioned behind front aerodynamic cover 18 and windshield 21 thereby reducing wind friction that may be caused by a user. Additionally, through bicycle 10 having a rear aerodynamic cover 16, turbulent wind currents may be streamlined away from main frame 11 allowing for an overall decrease in drag that may occur as bicycle 10 accelerates downhill. In this manner, through providing a non-mechanical bicycle made of light-weight materials and aerodynamic covers, wind resistance is reduced and acceleration of bicycle 10 is increased during use.

Figure 2:
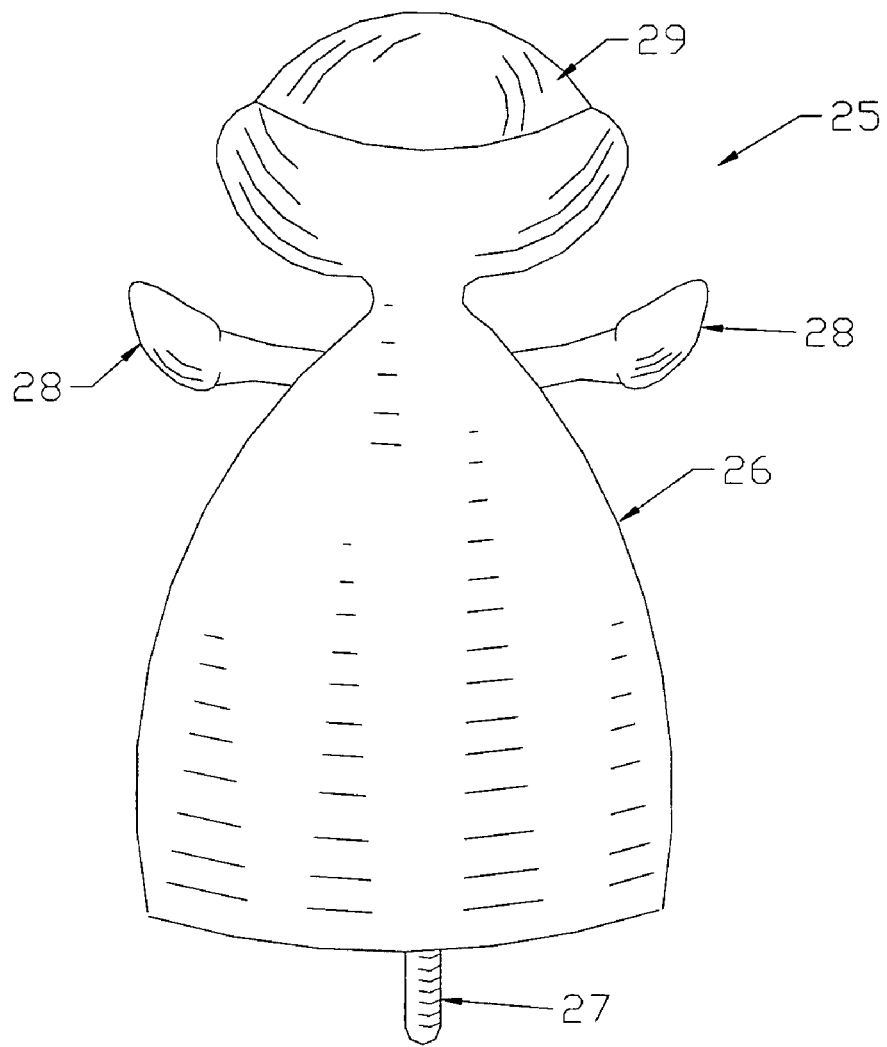
FIG. 2 illustrates a front perspective view of an aerodynamic coasting bicycle according to one embodiment of the invention.

FIG. 2 illustrates a front perspective view of an aerodynamic coasting bicycle according to one embodiment of the invention. An aerodynamic coasting bicycle 25 includes a front aerodynamic cover 26 covering a substantial portion of a front wheel 27 of bicycle 25. Front aerodynamic cover 26 further includes rear view mirrors 28 positioned to allow a user to view objects behind or along side bicycle 25 during use. A windshield 29 further enhances aerodynamics of bicycle 25 allowing a user to be positioned behind windshield 29 to reduce wind resistance of a user while allowing the user visibility.

Front aerodynamic cover 26 is operable to be coupled to a front portion of a main frame of bicycle 25 along each side of front wheel of bicycle 25. Front aerodynamic cover 26 is sized to cover at least fifty (50) percent of front wheel 17. Similarly, a rear aerodynamic cover (not expressly shown) is operable to be coupled to a rear portion of a main fame of bicycle 25 along each side of the rear wheel of the bicycle and sized to cover at least fifty (50) percent of the rear wheel of the bicycle. In this manner, a substantial portion of wind resistance, turbulence, drag, etc. that may be encountered during use of bicycle 25 may be reduced thereby increasing the overall acceleration of bicycle 25.

FIG. 3 illustrates a side perspective view of an aerodynamic coasting bicycle illustrating a reduced frame height according to one embodiment of the invention. A downhill racing bicycle 60 that lacks a conventional mechanical gear system and includes stainless steel or aluminum foot pegs 56 for allowing a user to rest their feet during use. Bicycle 60 further includes an elongated frame 40 having a front wheel mount 41 coupling a front wheel 42 having a front wheel cover 43. Bicycle 60 further includes a rear wheel mount 44 coupling a rear wheel 45 having a rear wheel cover 46. A front aerodynamic cover 47 includes a windshield 48 and is coupled to a front portion of front wheel mount 41 using front mounting brackets 51 and a rear aerodynamic cover 49 is coupled to a rear portion of elongated frame 40 using rear mounting brackets 52. Front mounting brackets 51 and rear mounting brackets 52 may be coupled to various locations along elongated frame 40 as needed to securely couple front aerodynamic cover 47 and rear aerodynamic cover 49. In one embodiment, front and rear mounting brackets 51 and 52 may be secured using threaded nut and bolts, wing nuts, etc. allowing for each aerodynamic cover to be removed and replaced as needed. Durable plastic coupling mechanisms may also be considered for securely coupling front and rear mounting brackets 51 and 52. In another embodiment, front and rear mounting brackets 51 and 52 may be welded to elongated frame 40 to permanently couple front aerodynamic cover 47 and rear aerodynamic cover 49 to elongated frame 40.

To further enhance aerodynamics of bicycle 60, elongated frame 40 may include a height 55 no greater than three (3) feet and a length 54 of no greater than, for example, fifty (50) inches as measured from front axel to rear axel. Through providing a bicycle having a reduced height and elongated frame, a lower profile or exposed surface area may be realized thereby reducing the amount of drag that may be produced during use. Bicycle 60 further includes a spoiler 53 coupled that may be coupled to elongated frame 40 and/or rear aerodynamic cover 49 and positioned behind seat 50. Spoiler 53 provides additional aerodynamic enhancement through reducing drag and providing a downward force to bicycle 60 during use. Spoiler 53 may be adjusted in a vertical direction and at various angles as needed to reduce back drafts that may result during use. For example, mechanical height and angle actuators or linkage may be used to increase or decrease the height and angle of spoiler based on the overall operational height of a user. Actuators or linkage may include brackets having a track for position spoiler 53 through various angles. Additionally, a height adjuster may include a first tube coupled to spoiler 53 and an sized to slidingly engage and fit within a second tube mounted to a rear portion of elongated frame 40. Height adjuster may include a series of apertures positioned vertical and sized to allow a spring actuated nipple to engage an aperature and allow for increasing and decreasing the overall height of spoiler 53.

Rear aerodynamic cover 49 may also include an adjustable foot placement saddle 59 that allows a user to place their feet along rear aerodynamic cover 49 during use. In this manner, a reduction in wind resistance may be realized by a user placing their feet on foot pegs 56 or by a user placing their feet within foot placement saddle 59 thereby altering the center of gravity of a user as needed and enhancing the speed of bicycle 60 during use.

Bicycle 60 is well suited for downhill racing through providing a light-weight bicycle having increased aerodynamic to optimize acceleration through non-mechanical propulsion means. For example, bicycle 60 lacks gears, linkage, chains, etc. used on a conventional bicycle. In this manner, a lightweight bicycle having streamlined aerodynamics may be provided to minimize drag that may be encountered due to wind resistance while allowing bicycle 60 to accelerate efficiently.

Bicycle 60 further includes a mechanical or hydraulic brake system 57 that includes front and/or rear disc brakes and at least on actuator (not expressly shown) for slowing and stopping bicycle 60 during use. Additionally, bicycle 60 includes handlebars 58 operatively coupled to elongated frame 40 for providing directional control of bicycle 60.

Note that although an embodiment of the invention has been shown and described in detail herein, along with certain variants thereof, many other varied embodiments that incorporate the teachings of the invention may be easily constructed by those skilled in the art. Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. Accordingly, the invention is not intended to be limited to the specific form set forth herein, but on the contrary, it is intended to cover such alternatives, modifications, and equivalents, as can be reasonably included within the spirit and scope of the invention.

What is claimed is:

1. An aerodynamic cycling apparatus comprising:
   a main frame including a rear wheel mount and a front wheel mount, the main frame constructed of light-weight materials and no mechanical drive assembly;
   a front wheel coupled to the front wheel mount, the front wheel including a front wheel cover substantially covering an interior portion of the front wheel;
   a gearless rear wheel coupled to the rear wheel mount, the rear wheel including a rear wheel cover substantially covering an interior portion of the rear wheel;
   a front aerodynamic cover substantially surrounding the front wheel and a front portion of the main frame, the front aerodynamic cover formed to allow placement of a user's legs between the main frame and the front aerodynamic cover;
   a rear aerodynamic cover substantially covering the rear wheel and a rear portion of the main frame;
   a rear spoiler coupled to the rear aerodynamic cover; and
   a rear view mirror assembly integrated as a part of the front aerodynamic cover to allow the user to view objects.

2. The apparatus as recited in claim 1 wherein the main frame comprises an elongated frame.

3. The apparatus as recited in claim 2 wherein the main frame further comprises:
   a length at least five (5) feet; and
   a height no greater than three (3) feet.

4. The apparatus as recited in claim 1 wherein the main frame comprises a braking system operably coupled to at least one of the front wheel and the rear wheel.

5. The apparatus as recited in claim 4 wherein the main frame comprises aluminum.

6. The apparatus of claim 1 wherein the main frame comprises titanium.

7. The apparatus as recited in claim 1 wherein the front and rear aerodynamic covers comprise a plastic material.

8. The apparatus as recited in claim 1 wherein the front and rear aerodynamic covers comprise a fiberglass material.

9. An apparatus for use with a coasting bicycle to provide aerodynamics during comprising:
   a front aerodynamic cover operable to be coupled to a front portion of a main frame of a bicycle along each side of a front wheel of the bicycle, the front aerodynamic cover sized to cover at least fifty (50) percent of the front wheel's laterally exposed face; and
   a rear aerodynamic cover operable to be coupled to a rear portion of a main fame of the bicycle along each side of the rear wheel of the bicycle, the rear aerodynamic cover sized to cover at least fifty (50) percent of the rear wheel's laterally exposed faces.

10. The apparatus as recited in claim 9 further comprising:
    a front wheel cover operable to be coupled to the front wheel to substantially cover an interior portion of the front wheel; and
    a rear wheel cover operable to be coupled to the rear wheel to substantially cover an interior portion of the rear wheel.

11. The apparatus as recited in claim 10 further comprising a rear spoiler operable to be coupled to a rear portion of the main frame of the bicycle.

12. The apparatus as recited in claim 9 further comprising a rear spoiler operable to be coupled to the rear aerodynamic cover.

13. The apparatus of claim 10 wherein the front aerodynamic cover includes at least one rear view mirror.

14. The apparatus of claim 9 wherein the front and rear aerodynamic covers comprise a plastic material.

15. The apparatus of claim 14 wherein the main frame comprises aluminum.

* * * * *